United States Patent
Grando et al.

(10) Patent No.: US 7,236,135 B2
(45) Date of Patent: Jun. 26, 2007

(54) REINFORCEMENT PIECE FOR A MOTOR VEHICLE, AND THE USE OF SUCH A PIECE AS AN ANTENNA

(75) Inventors: Jerome Grando, Vertrieu (FR); Bertrand Jaud, Lyons (FR)

(73) Assignee: Compagnie Plastic Omnium, Lyons (FR)

(*) Notice: Subject to any disclaimer, the term of this patent is extended or adjusted under 35 U.S.C. 154(b) by 0 days.

(21) Appl. No.: 11/405,437

(22) Filed: Apr. 18, 2006

(65) Prior Publication Data

US 2006/0284776 A1 Dec. 21, 2006

(30) Foreign Application Priority Data

Apr. 18, 2005 (FR) .................................. 05 03871

(51) Int. Cl.
*H01Q 1/32* (2006.01)
(52) U.S. Cl. ........................ 343/712; 343/713

(58) Field of Classification Search ................ 343/711, 343/712, 713
See application file for complete search history.

(56) References Cited

U.S. PATENT DOCUMENTS

| 5,739,794 | A  | * | 4/1998  | Nagy et al. .................. 343/713 |
| 5,999,134 | A  | * | 12/1999 | Dishart et al. .............. 343/713 |
| 6,266,023 | B1 | * | 7/2001  | Nagy et al. .................. 343/713 |
| 6,900,769 | B2 | * | 5/2005  | Schlieber et al. ........... 343/713 |
| 7,145,514 | B2 | * | 12/2006 | Lachenmaier et al. ...... 343/711 |

* cited by examiner

*Primary Examiner*—Tan Ho
(74) *Attorney, Agent, or Firm*—Oliff & Berridge PLC

(57) ABSTRACT

The invention relates to a reinforcement piece (6) for reinforcing a piece of motor vehicle bodywork, the reinforcement piece comprising at least one strip (8, 12) of thermoplastic material defining at least one opening (10) in the piece (6), the piece being covered at least in part in an electrically-conductive covering (14).

Figure 1:
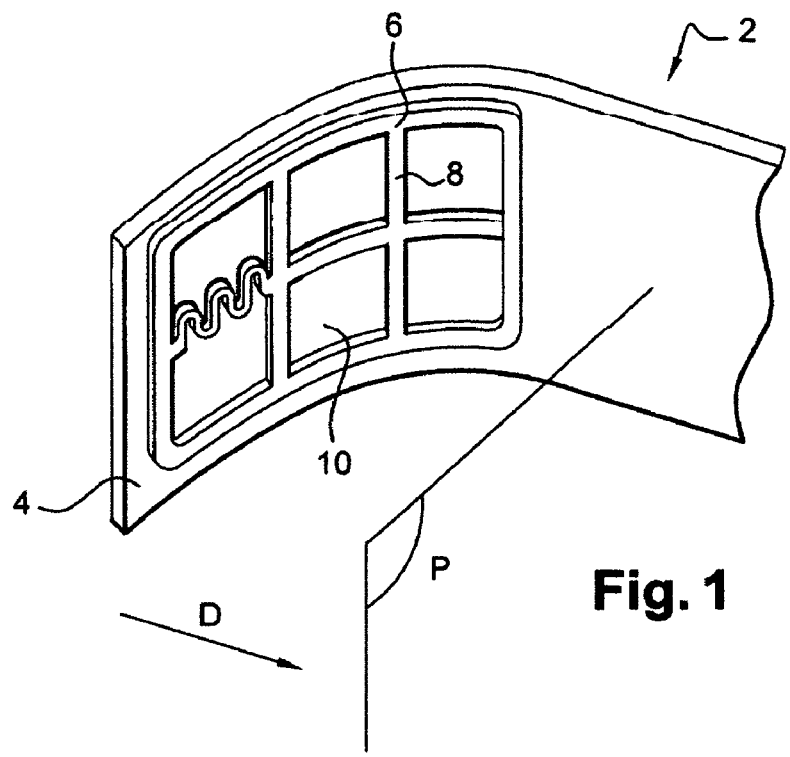

6 Claims, 2 Drawing Sheets

REINFORCEMENT PIECE FOR A MOTOR VEHICLE, AND THE USE OF SUCH A PIECE AS AN ANTENNA

TECHNICAL FIELD

The invention relates to reinforcement pieces for reinforcing motor vehicle bodywork pieces.

PRIOR ART

A piece is already known in the prior art for reinforcing a motor vehicle bodywork piece and comprising at least one strip of thermoplastic material. By way of example, such a reinforcement piece is used to reinforce a bumper overrider.

Also known are on-board antennas constituted by metal pieces fitted on vehicles during specific assembly operations.

PROBLEM POSED BY THE PRIOR ART

It is desirable to avoid the need to provide a specific assembly operation for fitting an antenna to a vehicle.

SOLUTION PROPOSED BY THE INVENTION

To this end, the invention provides a reinforcement piece for reinforcing a piece of motor vehicle bodywork, the reinforcement piece comprising at least one strip of thermoplastic material, and being characterized in that it is covered at least in part by an electrically-conductive covering in such a manner that there exist at least one projection direction and one projection plane such that:

projecting the covering onto the projection plane in said direction defines a first zone;

the projection of the piece defines a second zone;

the first zone and its complement in the second zone are separated by a boundary that intercepts the projection of at least one strip of material; and the boundary extends substantially transversely to the intercepted projection.

There is thus no longer any need to provide a specific assembly operation for fitting the antenna to the vehicle since the antenna can be made merely by applying a conductive covering on the piece. The antenna then forms an integral portion of the reinforcement piece.

In addition, since the boundary intercepts the strips of material transversely, it is easy to isolate the portion of the piece on which it is desired to apply the covering and to perform this application by spraying electrically-conductive material such as a paint containing particles of metal.

Advantageous Particular Embodiments

Preferably, the piece comprises a plurality of strips defining at least one opening in the piece.

The covering is easy to apply uniformly on the strip, e.g. with the help of a pad. In addition, when the covering is applied by spraying an electrically-conductive material, it is particularly advantageous to spray the material perpendicularly to the strip so as to ensure that the strip is covered uniformly.

Optionally, a plastics material piece of invention may include one or more of the following characteristics:

the first zone is connected;

the piece constitutes reinforcement for a bumper overrider.

The invention also provides the use of a strip of thermoplastic material of a piece as defined above as an antenna.

Preferably, the antenna is selected from a TV antenna, a GPS antenna, an AM/FM radio antenna, an antenna for a mobile telephone, e.g. using the GSM standard, an element for remote keyless entry, or a capacitive sensor element.

DESCRIPTION OF AN EXAMPLE

FIG. 1 shows a bumper 2 having an overrider 4 that is reinforced by a reinforcement piece 6 of thermoplastic material. The piece 6 is fitted on an inside face of the overrider 4.

Figure 2:
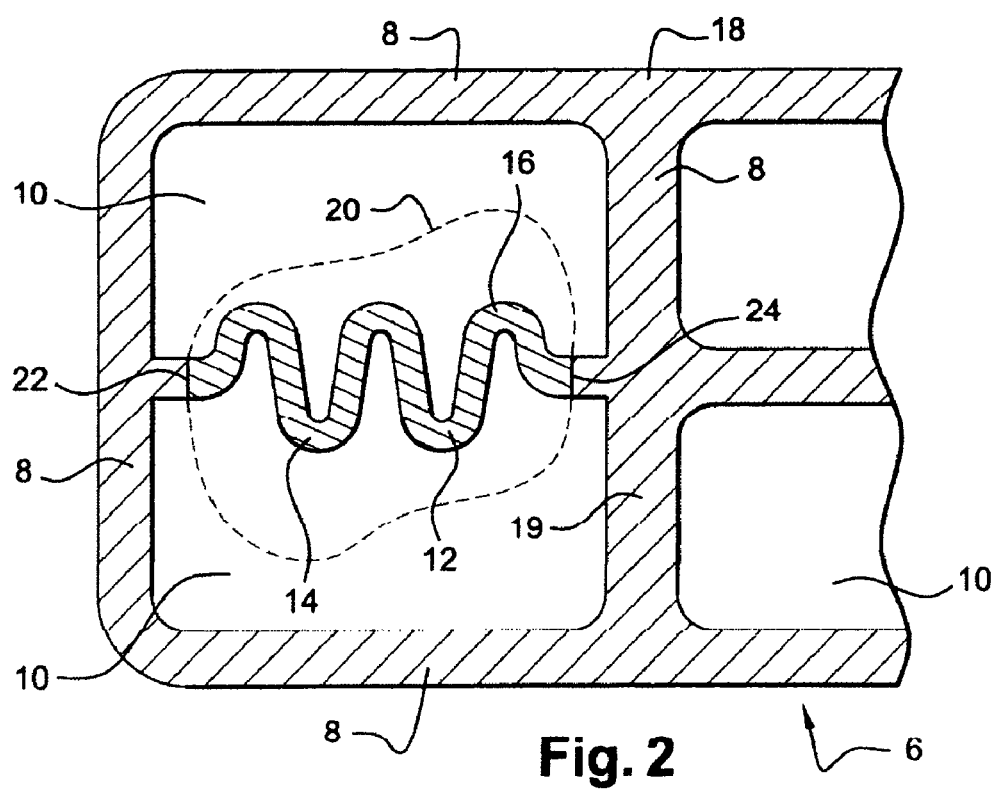

A projection plane P and a projection direction D are defined. FIG. 2 shows the projection of the piece 6 on the plane P in the direction D. In the example shown, the piece 6 is substantially plane and the plane P is substantially parallel to the piece 6. The direction D is orthogonal to the plane P.

The piece 6, a part of which is shown in greater detail in FIG. 2, comprises a plurality of strips 8 of thermoplastic material defining openings 10 in the piece 6.

The piece 6 also comprises a strip 12 of thermoplastic material shaped to form an antenna once its face that is visible in the drawing has been covered in an electrically-conductive covering 14, which thus covers part of the piece 6.

The piece 6 is made as a single piece by molding a thermoplastic material.

Projecting the covering 14 onto the projection plane P along the direction D defines a first connected zone 16.

Projecting the piece 6 defines a second zone 18.

The complement 19 of the first zone 16 is defined in the second zone 18. The first zone 16 and its complement 19 are separated by a boundary 20.

The boundary 20 intercepts the projection of the strip of material 12 substantially transversely along two segments 22 and 24. In other words, the strip of material 12 is covered by the covering 14 over its entire width between the segments 22 to 24.

Figure 3:
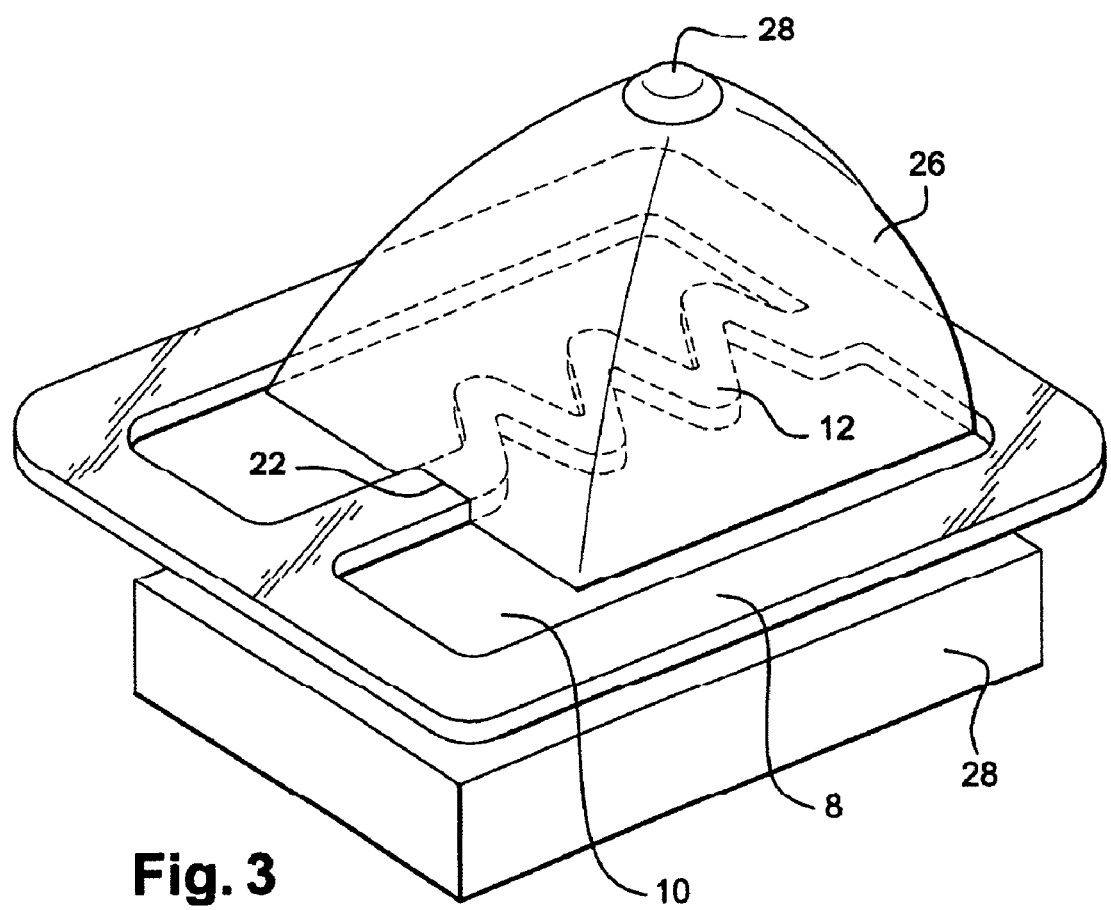

The covering 14 is applied to the strip of material 12 in simple manner by spraying electrically-conductive material onto the strip 12. To do this, it is possible to use a painting bell 26 as shown in FIG. 3. The bell 26 includes an orifice 28 in which a spray device (not shown) is placed to spray the electrically-conductive material.

The bell is placed on the piece 6 in such a manner that it covers only the strip 12 that forms the antenna. Thus, the sprayed material is confined within the bell and does not cover any of the strips 8 other than the strip 12 that forms the antenna.

Because of the openings 10 that surround the strip of material 12, any material sprayed into the bell 26 and that does not encounter the strip 12, passes through the openings 10 without covering any other portion of the piece 6. The shape of the antenna is thus exactly the same as the shape of the strip 12, and it can therefore be accurately defined when designing and manufacturing the strip 12.

It is thus very easy to cover a portion of the reinforcement piece in electrically-conductive material without requiring the use of time-consuming techniques such as masking.

Optionally, a material-receiver bowl 28 can be placed under the bell to receive the sprayed material that passes through the openings 10.

The invention claimed is:

1. A reinforcement piece (6) for reinforcing a piece of motor vehicle bodywork, the reinforcement piece comprising at least one strip (8, 12) of thermoplastic material, and being characterized in that it is covered at least in part by an electrically-conductive covering (14) in such a manner that there exist at least one projection direction (D) and one projection plane (P) such that:

projecting the covering (14) onto the projection plane in said direction defines a first zone (16);

the projection of the piece (6) defines a second zone (18);

the first zone (16) and its complement (19) in the second zone (18) are separated by a boundary (20) that intercepts the projection of at least one strip of material (12); and the boundary (20) extends substantially transversely to the intercepted projection.

2. A motor vehicle piece (6) according to claim 1, comprising a plurality of strips (8, 12) defining at least one opening (10) in the piece (6).

3. A piece according to claim 1 or claim 2, in which the first zone (16) is connected.

4. A piece (6) according to any preceding claim, forming reinforcement (6) for an overrider (4) of a bumper (2).

5. The use of a strip (12) of thermoplastic material of a piece according to any preceding claim as an antenna.

6. The use of a strip (12) of material according to claim 5, in which the antenna is selected from a TV antenna, a GPS antenna, an AM/FM radio antenna, an antenna for a mobile telephone, e.g. using the GSM standard, an element for remote keyless entry, or a capacitive sensor element.

* * * * *